US005549012A

United States Patent [19]
Read

[11] Patent Number: 5,549,012
[45] Date of Patent: Aug. 27, 1996

[54] ANGLE OSCILLATING POWER DRIVE FOR ROTATING OR SWINGING A HINGED MEMBER

[76] Inventor: John C. Read, 2627 Lone Jack Rd., Olivenhain, Calif. 92024

[21] Appl. No.: 363,922

[22] Filed: Dec. 27, 1994

[51] Int. Cl.[6] .............................. F16H 23/00; E05F 15/12
[52] U.S. Cl. ................................................. 74/60; 49/334
[58] Field of Search ........................... 74/60, 839; 49/334

[56] References Cited

U.S. PATENT DOCUMENTS

| 273,699 | 3/1883 | Altham | 74/60 |
| 1,059,568 | 4/1913 | Ross | 74/60 X |
| 2,246,689 | 6/1941 | Kost | 74/60 X |

FOREIGN PATENT DOCUMENTS

| 152351 | 6/1904 | United Kingdom | 74/60 |

*Primary Examiner*—Allan D. Herrmann
*Attorney, Agent, or Firm*—Brown, Martin, Haller & McClain

[57] ABSTRACT

A rotary drive for swinging a heavy member between two extreme positions. The drive transmits a rotary force provided by a motor or similar device through a first rotatable shaft to a second rotatable shaft perpendicular to the first shaft and connected to the heavy member. The second shaft rotates in an oscillatory manner between the extreme positions in response to rotation of the first shaft. The member may thus be positioned at any suitable location in its travel by operating the motor unidirectionally. The first shaft rotates about a first axis of rotation and rotates an arm about a second axis of rotation that intersects the first axis at an angle between zero and 90 degrees non-inclusive. The arm is connected to a universal joint having three mutually perpendicular axes. The universal joint transmits forces from the arm to the second shaft.

12 Claims, 2 Drawing Sheets

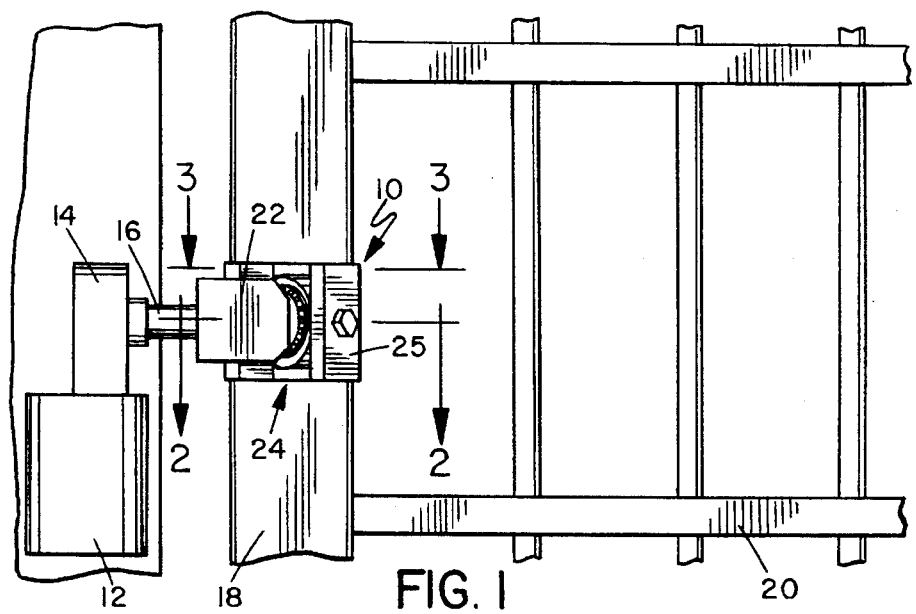
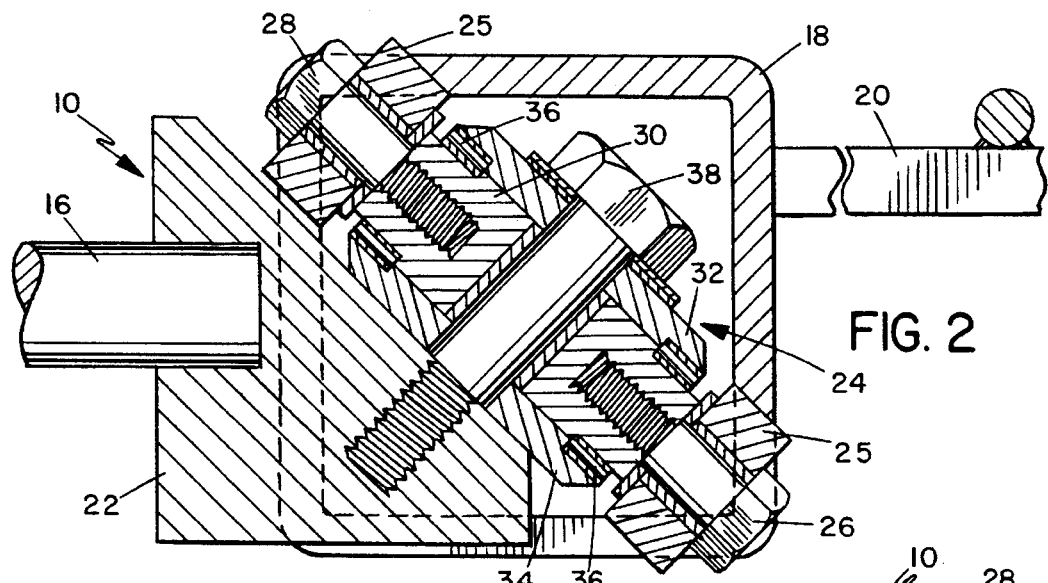
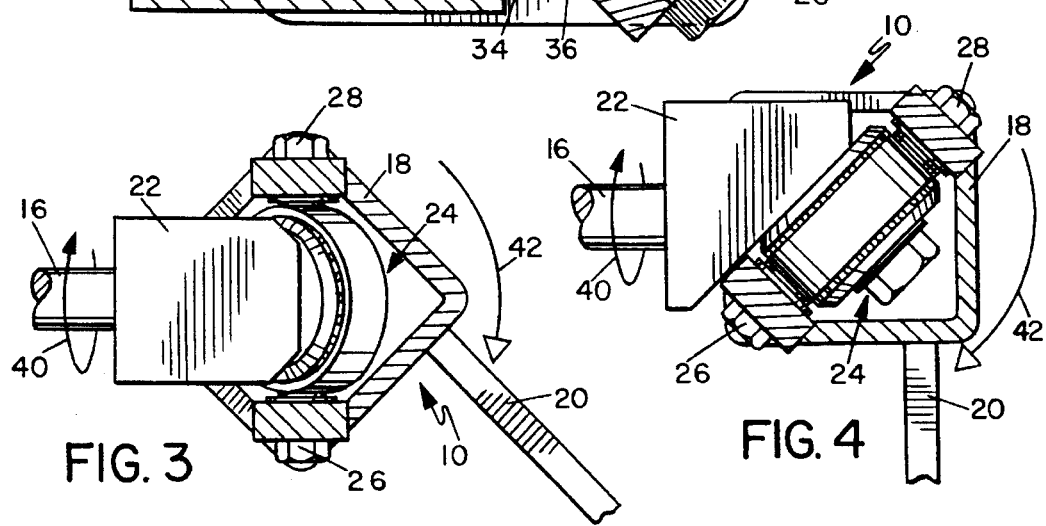

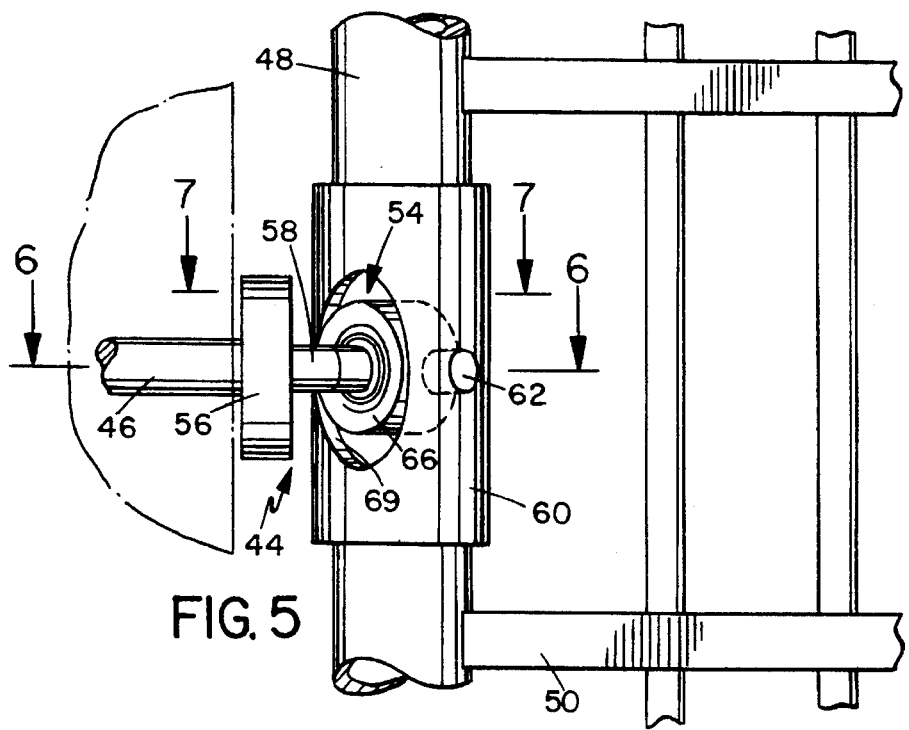
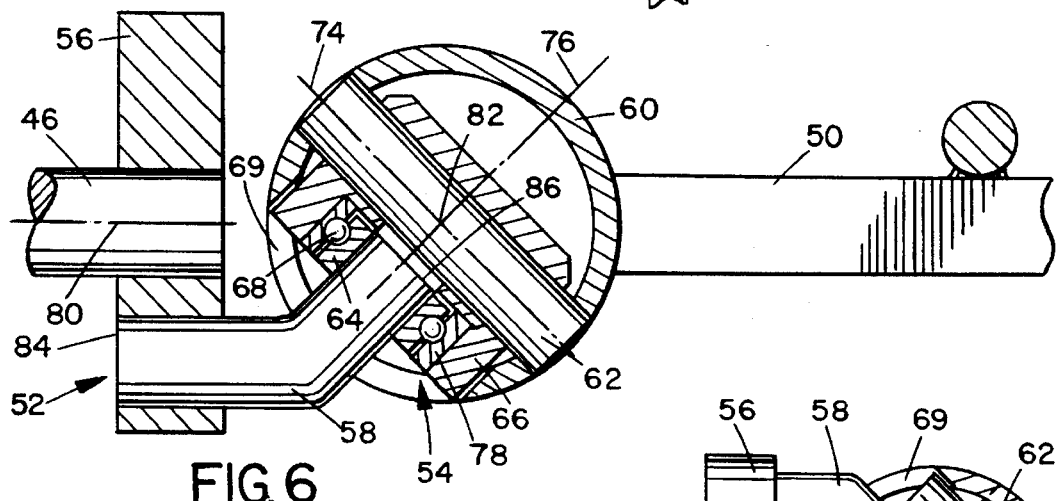
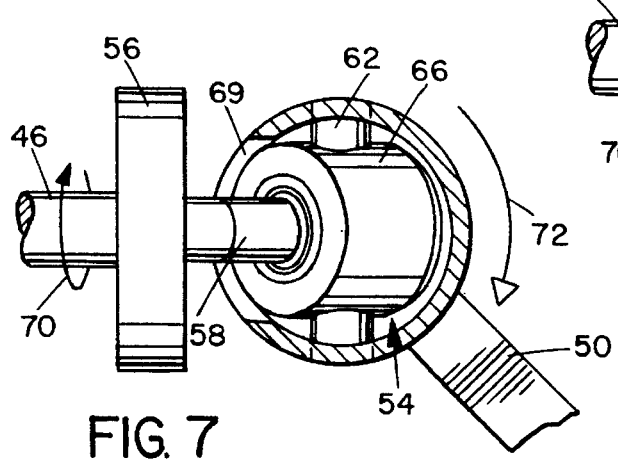
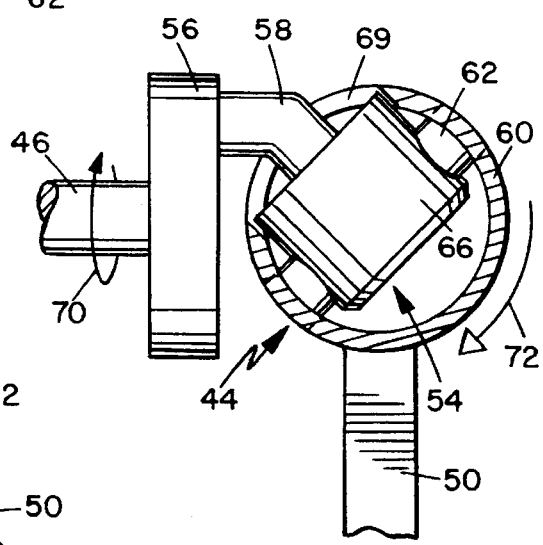

5,549,012

ANGLE OSCILLATING POWER DRIVE FOR ROTATING OR SWINGING A HINGED MEMBER

BACKGROUND OF THE INVENTION

The present invention relates generally to rotary drives or actuators for swinging or rotating relatively heavy hinged objects such as security gates and, more specifically, to such a drive that converts a continuous rotary force into an oscillatory rotary force.

Right angle drives are used to transmit a rotary force from a first rotating member to a second rotating member disposed at a right angle to the first member. Right angle drives may include worm gears or crown gears. Such drives are commonly used in combination with reduction gearing in aircraft landing gear actuators and similar actuators.

It is desirable to reverse an actuator, such as an aircraft landing gear, that includes a right angle drive. To reverse such an actuator, either the motor that generates the rotary force must be reversed or the actuator must be provided with complex gearing.

Certain conventional right angle drives transmit force applied to the first rotating member to the second rotating member equally as efficiently as they transmit force from the second rotating member to with the first rotating member. In an actuator such as those used on landing gear, however, it is desirable to prevent landing forces experienced by the landing gear wheels from rotating the drive and motor and thereby collapsing the landing gear.

These problems and deficiencies are clearly felt in the art and are solved by the present invention in the manner described below.

SUMMARY OF THE INVENTION

The present invention comprises a rotary drive for transmitting a rotary force generated by a motor or similar device from a first rotatable shaft to a second rotatable shaft perpendicular to the first shaft and connected to a heavy swingable member, such as a security gate, door, or aircraft landing gear. The second shaft rotates in an oscillatory manner in response to rotation of the first shaft. The first shaft rotates about a first axis of rotation and rotates an arm about a second axis of rotation that intersects the first axis at an angle between zero and 90 degrees non-inclusive. The arm is connected to a universal joint having three mutually perpendicular axes. The universal joint transmits forces from the arm to the second shaft.

The universal joint comprises a rotary coupling or slip joint and a hinge or pivotal joint. The first and second sides of the rotary coupling rotate with respect to each other about a second axis that intersects the first axis at a predetermined angle of between zero and 90 degrees non-inclusive, but preferably between about 30 and 60 degrees. An arm connects the first shaft to one side of the rotary coupling. The word "arm" is used herein only for convenience and is intended to include, in addition to elongated members, members of any suitable shape that can connect the rotary coupling to the first shaft at the predetermined angle, such as a wedge-shaped member. The hinge rotatably or pivotally connects the second side of the rotary coupling to the second shaft. The hinge rotates about the third axis, and the second shaft rotates about the fourth axis.

In operation, rotating the first shaft drives the arm in a crank-like manner. The second axis traverses a conical area having a vertex at the fourth axis. In response, the second shaft rotates in an oscillatory manner about the fourth axis. The second shaft is at the central position or minimum of its oscillation cycle when the first and third axes are perpendicular. As the second axis traverses the conical area, the third axis rotates away from this central position. The second shaft is at one of the limits or maxima of its oscillation cycle when the third axis has rotated away from the central position by an angle equal to the predetermined angle between the first and second axes.

The drive may be used to move or swing or rotate a member connected to the second shaft. Although the drive may be used in mechanisms in which it oscillates a member, the drive is particularly useful in actuators in which it moves a relatively heavy member to one of two extreme positions, such as aircraft landing gear and control surface actuators and security gate actuators.

The drive of the present invention facilitates the design of economical actuators having control mechanisms of minimal complexity and number. To move a member from one extreme position to the opposite extreme position, such as to extend a landing gear or open a gate, the motor or similar means for generating a rotary force may be operated for a short period. To return the member to its starting position, such as to retract the landing gear or close the gate, the motor may be operated for the same short period and in the same direction of rotation; the motor need not be reversed. In addition, the drive amplifies the force generated by the motor. An economical, non-reversible, relatively low-power motor may therefore be used to swing relatively heavy members.

The drive of the present invention also prevents rotary forces experienced by the second shaft from rotating the first shaft. In any position of its travel, the drive is essentially locked against undesirable movement.

In addition, the drive of the present invention can move a driven member smoothly and efficiently between the limits of its travel. The second shaft rotates more slowly toward the limits of its travel and more rapidly as it passes its central position because its motion is harmonic or sinusoidal. The driven member, such as a landing gear or a gate, is automatically decelerated as it nears the extreme position and is thus gently maneuvered into position. The driven member therefore tends not to overshoot the desired position. Stress and wear on moving parts is minimized.

Furthermore, the range of travel of a driven member connected to the second shaft can be selected by selecting the predetermined angle between the first and second axes. The second shaft will traverse an angle that is twice the predetermined angle between the first and second axes. If the first and second axes intersect at an angle of 45 degrees, for example, the second shaft will rotate 45 degrees in either direction from its central position for a total range of travel of 90 degrees.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein:

FIG. 1 is a side view of the drive installed in a security gate actuator, with the gate shown in a closed position;

FIG. 2 is an enlarged sectional view taken on line 2—2 of FIG. 1;

FIG. 3 is an enlarged sectional view taken on line 3—3 of FIG. 1, with the gate driven to the half open position;

FIG. 4 is a view similar to FIG. 3, but with the gate driven to the fully open position;

FIG. 5 is a side elevation view of an alternative drive installed in a security gate actuator, with the gate shown in a closed position;

FIG. 6 is an enlarged sectional view taken on line 6—6 of FIG. 5;

FIG. 7 is an enlarged sectional view taken on line 7—7 of FIG. 5, with the gate driven to the half open position; and FIG. 8 is a view similar to FIG. 7, but with the gate driven to the fully open position.

DESCRIPTION OF PREFERRED EMBODIMENTS

As illustrated in FIG. 1, the drive 10 of the present invention is installed in a gate actuator, which further includes a suitable motor 12 and reduction gearing 14. Motor 12 constitutes an exemplary non-reversing motive means for generating a unidirectional rotary force. Motor 12 and reduction gearing 14 transmit rotary force to a first shaft 16. Drive 10 converts the rotary force it receives via first shaft 16 to an oscillatory rotary force and applies it to a second shaft 18. The gate actuator can open and close a heavy, generally planar member, such as a gate 20, which is connected to second shaft 18, as described below.

Drive 10 is illustrated in further detail in FIG. 2. Drive 10 comprises a wedge-shaped arm 22 and a rotary coupling 24. Rotary coupling 24 and second shaft 18 cooperate to form a universal joint that allows arm 22 to move freely with respect to three mutually perpendicular axes. First shaft 16, which is rotatable about a first axis of rotation (not shown), is connected to wedge shaped arm 22. Coupling 24 is pivotally or hingedly retained in a housing 25 by two hinge pin bolts 26 and 28 that extend through bearing bores in opposing walls of housing 25. Housing 25 is preferably welded in place in shaft 18, although it may be connected to shaft 18 in any other suitable manner, such as by forming housing 25 integrally with shaft 18 or by fastening housing 25 to shaft 18.

Coupling 24 comprises an annular or toroidal member 30 retained between two disc-shaped retainer plates 32 and 34. A plurality of roller bearings 36 are retained in opposing bearing races in plates 32 and 34 and in toroidal member 30 and facilitate relative rotation between plates 32–34 and toroidal member 30 about a second axis of rotation (not shown). In the illustrated embodiment, this second axis of rotation intersects the first axis of rotation at an angle of 45 degrees. A bolt 38 extends through plate 32, toroidal member 30, and plate 34, and secures coupling 24 to arm 22. Hinge pin bolts 26 and 28 are received in threaded bores in toroidal member 30 and facilitate rotation or pivoting of coupling 24 about a third axis of rotation with respect to housing 25 and shaft 18. The portion of housing 25 from which arm 22 extends is open to prevent housing 25 from interfering with the motion of arm 22.

As illustrated in FIGS. 3 and 4, shaft 18 is rotatable about a fourth axis of rotation (not shown) that is perpendicular to the first, second and third axes of rotation. Rotation of shaft 18 moves gate 20 between open and closed positions. The gate is shown in the closed position in FIG. 2. Rotation of first shaft 16 in the direction of arrow 40 causes second shaft 18 and gate 20 to rotate in the direction of arrow 42. If shaft 16 were continuously rotated at a constant velocity, shaft 18 and gate 20 would oscillate between the position shown in FIG. 2 and the position shown in FIG. 4 in a sinusoidal or harmonic manner. Shaft 18 is shown in the central position of its oscillation cycle in FIG. 3.

Another embodiment of the invention is illustrated in FIGS. 5–8. As illustrated in FIG. 5, a drive 44 of the present invention is installed in a gate actuator in the same manner as in the embodiment described above with respect to FIGS. 1–4. Drive 44 converts the rotary force it receives via a first shaft 46 to an oscillatory rotary force and applies it to a second shaft 48. The gate actuator can open and close a gate 50, which is connected to second shaft 48, as described below.

Drive 44 is illustrated in further detail in FIG. 6. Drive 44 comprises a crank-like arm 52 and a rotary coupling 54. Rotary coupling 54 and second shaft 48 cooperate to form a universal joint that allows arm 52 to move freely with respect to three mutually perpendicular axes. First shaft 46, which is rotatable about a first axis of rotation 80, is connected to crank-like arm 52. Crank-like arm 52 comprises a disc 56 and an elongated member, such as a crank 58. The proximal end 84 of crank 58 is connected to a point on disc 56 spaced radially away from the first axis of rotation. The distal end 86 of crank 58 is connected to coupling 54. Coupling 54 comprises an exemplary first hinge portion, described in further detail below, and is pivotally or hingedly retained in a cylindrical housing 60 by a second hinge portion, such as a hinge pin 62 that extends through bearing bores in opposing walls of housing 60. Housing 60 is preferably welded in place in shaft 48, although it may be connected to shaft 48 in any other suitable manner, such as by forming housing 60 integrally with shaft 48 or by fastening housing 60 to shaft 48.

Coupling 54 comprises an annular or toroidal member 64 retained in a cup-shaped body 66, which defines the exemplary first hinge portion noted above. A plurality of ball bearings 68 are retained in opposing bearing races 78 in toroidal member 64 and body 66 and facilitate relative rotation between member 64 and body 66 about a second axis of rotation 74. In the illustrated embodiment, this second axis of rotation intersects the first axis of rotation at an angle of 45 degrees. As described above, coupling 54 pivots or rotates on hinge pin 62 about a third axis of rotation 76. The portion of housing 60 from which arm 52 extends has an opening 69 to prevent housing 60 from interfering with the motion of arm 52.

As illustrated in FIGS. 7 and 8, shaft 48 is rotatable about a fourth axis of rotation 82 that is perpendicular to the first, second and third axes of rotation. Rotation of shaft 48 moves gate 50 between open and closed positions. The gate is shown in the closed position in FIG. 6. Rotation of first shaft 46 in the direction of arrow 70 causes second shaft 48 and gate 50 to rotate in the direction of arrow 72. If shaft 46 were continuously rotated at a constant velocity, shaft 48 and gate 50 would oscillate between the position shown in FIG. 6 and the position shown in FIG. 4 in a sinusoidal or harmonic manner. Shaft 48 is shown in the central position of its oscillation cycle in FIG. 7.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A drive for swinging a heavy member between two extreme positions, comprising:

non-reversing motive means for generating a unidirectional rotary force;

reduction means connected to said motive means for reducing a speed of said rotary force;

a first shaft rotatable about a first axis of rotation, said first shaft connected to said reduction means;

an arm connected to said first shaft;

a universal joint connected to said arm, said universal joint having second, third and fourth mutually perpendicular axes of rotation, said second axis of rotation intersecting said first axis of rotation at a predetermined angle between zero and 90 degrees; and a second shaft connected to said heavy member and rotatable about said fourth axis of rotation and connected to said universal joint, said fourth axis of rotation perpendicular to said first axis of rotation.

2. The drive claimed in claim 1, wherein said second shaft comprises a hollow housing portion, and said universal joint is disposed within said housing portion, said arm extending through an opening in said housing portion.

3. The drive claimed in claim 1, wherein said extreme positions are defined in response to said predetermined angle.

4. The drive claimed in claim 3, wherein said predetermined angle is between 30 degrees and 60 degrees.

5. A drive, comprising:

an arm comprising an elongated member rigidly connectable to a first shaft having a first axis of rotation;

a first coupling portion connected to said arm;

a second coupling portion rotatably connected to said first coupling portion for rotation about a second axis of rotation, said second axis of rotation intersecting said first axis of rotation at a predetermined angle between zero and 90 degrees;

said elongated member having a proximal end disposed eccentrically with respect to said first axis of rotation and substantially aligned along said first axis of rotation and having a distal end substantially aligned along said second axis of rotation;

a first hinge portion rigidly connected to said second coupling portion; and a second hinge portion rotatably connected to said first hinge portion for rotation about a third axis of rotation perpendicular to said second axis of rotation, said second hinge portion rigidly connectable to a second shaft having a fourth axis of rotation perpendicular to said first, second and third axes of rotation.

6. The drive claimed in claim 5, wherein said arm further comprises a disc connected to said proximal end of said elongated member for eccentrically disposing said proximal end with respect to said first axis of rotation.

7. The drive claimed in claim 5, wherein said distal end of said elongated member is connected to said first coupling portion.

8. The drive claimed in claim 7, wherein said first hinge portion comprises a cup-shaped housing, and said first and second coupling portions are concentrically disposed in said cup-shaped housing.

9. The drive claimed in claim 8, wherein:

said first hinge portion further comprises a pin; and said second hinge portion comprises a hollow housing having opposing bearing openings therein for rotatably receiving said pin.

10. The drive claimed in claim 8, further comprising a plurality of ball bearings retained between said first and second coupling portions.

11. The drive claimed in claim 5, wherein said predetermined angle is between 30 degrees and 60 degrees.

12. The drive claimed in claim 11, wherein said predetermined angle is approximately 45 degrees.

* * * * *